US011000014B2

(12) United States Patent
Karras

(10) Patent No.: US 11,000,014 B2
(45) Date of Patent: May 11, 2021

(54) PET TREAT HOLDER AND SAFETY DEVICE

(71) Applicant: Vasiliki Karras, Granite Bay, CA (US)

(72) Inventor: Vasiliki Karras, Granite Bay, CA (US)

( * ) Notice: Subject to any disclaimer, the term of this patent is extended or adjusted under 35 U.S.C. 154(b) by 104 days.

(21) Appl. No.: 16/270,698

(22) Filed: Feb. 8, 2019

(65) Prior Publication Data

US 2019/0269099 A1 Sep. 5, 2019

Related U.S. Application Data

(60) Provisional application No. 62/710,721, filed on Feb. 26, 2018.

(51) Int. Cl.
*A01K 15/02* (2006.01)

(52) U.S. Cl.
CPC .................. *A01K 15/025* (2013.01)

(58) Field of Classification Search
CPC .. A01K 5/0114; A01K 5/0135; A01K 5/0142; A01K 15/02; A01K 15/025; A01K 15/026; A47K 10/42; A47K 10/421; A47K 10/422; A47K 10/423; A47K 10/424; A47K 10/425; A47K 10/426; A47K 10/427; A47K 2010/3233; B65D 83/0805
USPC ......... 119/707, 708–710; 221/45–50, 56, 57, 221/64, 221
See application file for complete search history.

(56) References Cited

U.S. PATENT DOCUMENTS

| | | | | |
|---|---|---|---|---|
| 5,813,366 A | * | 9/1998 | Mauldin, Jr. | A01K 15/025 119/707 |
| 6,905,025 B2 | * | 6/2005 | Morin | B65D 83/0805 206/233 |
| 7,597,213 B2 | * | 10/2009 | McDonald | B65D 83/0805 220/229 |
| 2011/0011876 A1 | * | 1/2011 | Baer | B65D 83/0805 221/1 |
| 2011/0284567 A1 | * | 11/2011 | Hatter | B65H 75/10 221/1 |
| 2012/0085294 A1 | * | 4/2012 | Christianson | A01K 15/025 119/707 |
| 2012/0152180 A1 | * | 6/2012 | McCann | A01K 5/0114 119/707 |
| 2016/0255812 A1 | * | 9/2016 | Wolfe, Jr. | A01K 15/025 |
| 2018/0020887 A1 | * | 1/2018 | Gordon | A47K 10/421 221/45 |
| 2018/0271062 A1 | * | 9/2018 | Toolan | A01K 15/026 |

* cited by examiner

*Primary Examiner* — William V Gilbert

(57) ABSTRACT

A pet treat holding device designed to secure rigid pet treats and prevent dogs from choking on the treat, thereby eliminating the risk of stomach blockage and other health hazards. Through the application of compression and friction, the holder creates a gripping force around the rigid treat that prevents a dog from extracting a large piece of the treat, which could be hazardous if ingested. The pet treat holder is comprised of two rubber parts, the torus shaped housing surrounding an interior aperture. The treat is secured by compression and friction created by the center aperture. After inserting the treat stick into the opening and applying a twisting motion, securing the treat in place, the user can then present the treat to the dog. Because of the twisting lock action, the dog cannot remove the stick by chewing or pulling.

3 Claims, 2 Drawing Sheets

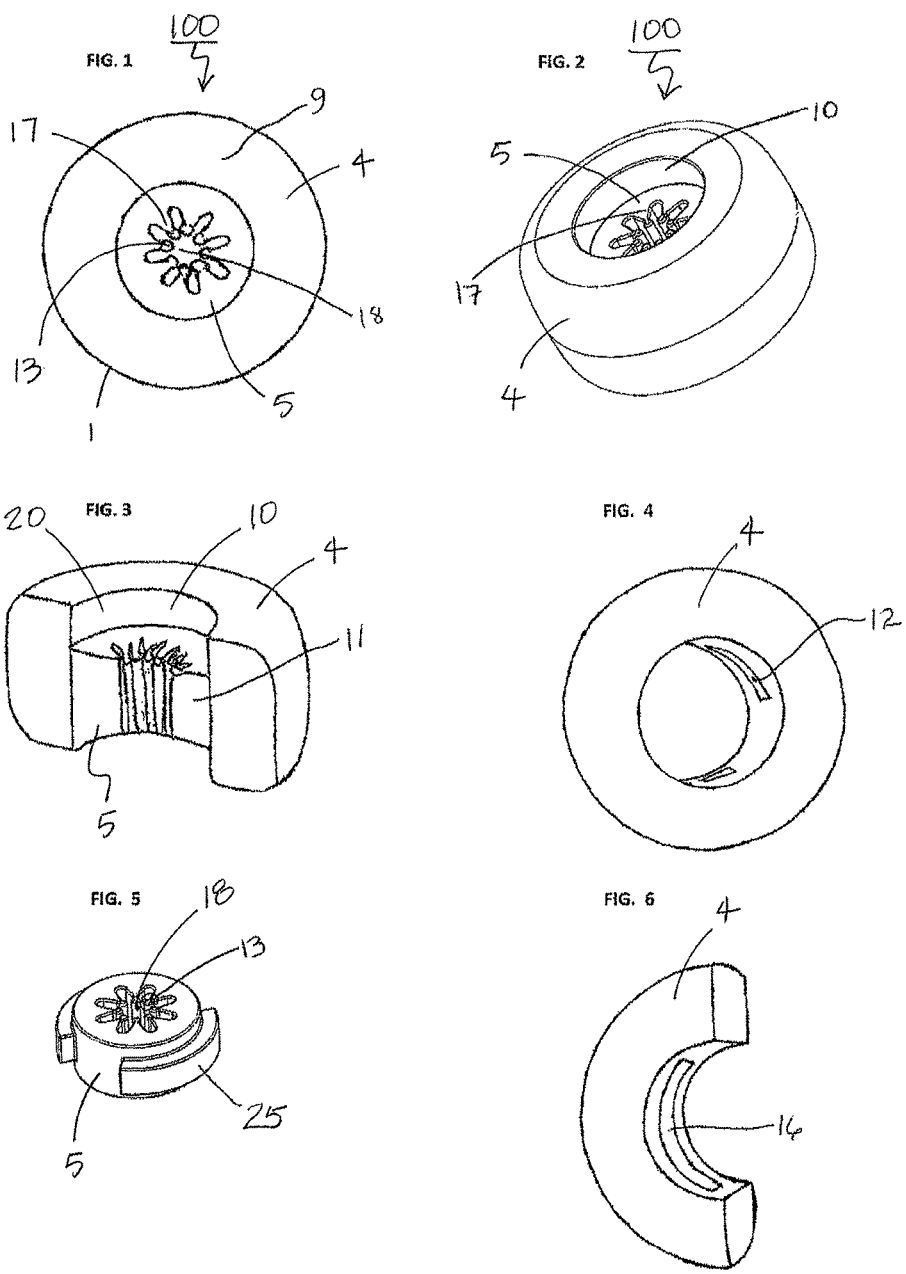

PET TREAT HOLDER AND SAFETY DEVICE

CROSS REFERENCE TO RELATED APPLICATION

This application claims priority to U.S. Provisional Application Ser. No. 62/710,721 filed Feb. 26, 2018.

FIELD

Technology for pets currently relates to employing toys as treat holding devices. Although this unit could he used as a fetch toy, it mainly functions as a safety device that renders chew sticks safe for dogs. Through the use of dual molded components and a locking aperture, the two parts integrate into a single structure that functions seamlessly and with no edges. When molded together in manufacturing, the assembly renders rigid or semi-rigid, straight, curved, or spiral shape dog treats safe for chewing.

BACKGROUND OF INVENTION

This invention relates to pet treats that are rigid in nature (such as bully sticks, raw hide sticks, deer antler, and treat sticks that are bone like. They are consumable by dogs and pose a health hazard when eating these treats without a safety device attached. Dogs will chew on these treats until they can fit the entire treat in their mouth, then prematurely swallow the treat whole. There is a need for such a treat holder because choking and stomach blockage due to ingestion of a large piece of treat stick is a common issue for pet owners. The cost to pet owners when their dogs swallow a large piece of treat stick can be substantial. It also relates to a chew toy that will provide your pet enjoyable entertainment.

The treat holders that are available today are not dog friendly. Dogs can destroy a treat holder if it has too many parts and ingest a loose part, which can then become a safety hazard. Also, the treat stick holders on the market today can only be attached to a straight treat stick, this holder can attached to many different shapes of treat sticks, such as straight, curved or spiral due to its flexible center aperture, as long as the treat is rigid or semi rigid.

SUMMARY

By providing a pet safety device that is made of non-toxic material and can hold a device in place, without being a hazard in itself Pet owners will benefit in keeping their dogs safe while consuming chew sticks that have been known to cause a hazard when prematurely ingested by dogs.

BRIEF DESCRIPTION OF THE DRAWINGS

FIG. 1 illustrates a front view of the device.
FIG. 2 illustrates a side view of the device.
FIG. 3 illustrates a view of the device split in the center.
FIG. 4 illustrates a view of the torus shape split in half.
FIG. 5 illustrates a side view of the center aperture.
FIG. 6 illustrates a side view of the torus split in half.

DETAILED DESCRIPTION OF INVENTION

Figure 7:
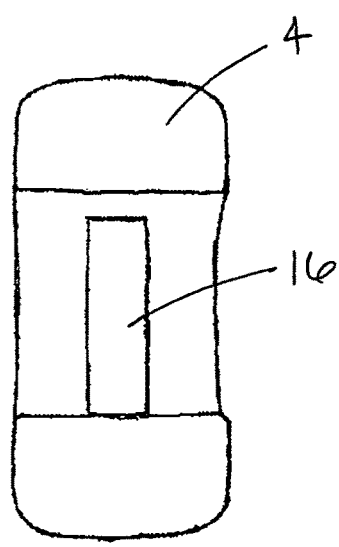
FIG. 7 illustrates a front view of the torus split in half.
Figure 8:
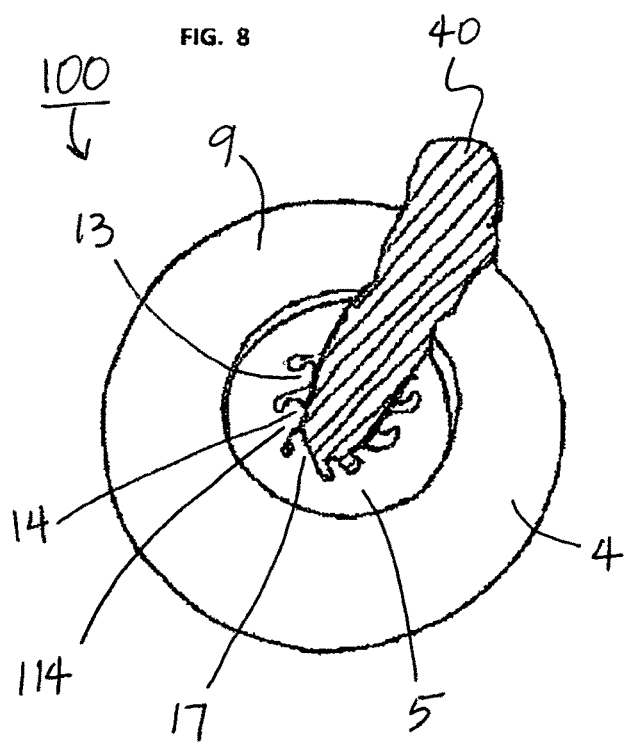
FIG. 8 illustrates a top view of the holding device with a treat inserted.

This relates to a pet safety device, specifically a chew stick holder 100 for dogs. The design requires over-molding during the manufacturing process.

This holder 100 is made of two parts: a circular or torus shaped outer housing 4 and a center aperture insert 5. An over-molding process melts the two parts together making the entire holder 100 essentially one piece 1.

The torus shaped outer housing 4 is made from a stronger and harder rubber 9 material than the rubber of the inner center aperture insert 5. The center aperture insert 5 is placed at a depth 10 below a highest point of a torus aperture 20 so that a pet cannot easily reach it. The center aperture insert 5 is solid, and flexible 11.

The center aperture insert 5 fits when tabs 25 are over-molded during manufacturing into the inner circular opening 12, 16 of the torus shaped outer housing 4. The center aperture insert 5 consists of solid projections 17 with a plurality pointing towards a centermost opening 18. Each of the projections 17 narrows in toward the centermost opening 18 with an exaggerated beaded shape 13 at a proximal end. A solid object or chew stick 40 can be inserted into this centermost opening 18, with the application of repeated torque inputs by the dog owner, the chew stick 40 twists in and through the centermost opening 18, similar to screwing a lag bolt into a solid material. With increased force and torque, the chew stick 40 travels further through the holder 100 and locks more securely. Through the forces of compression and friction the bead shaped tips 13 of the projections 17 deflect to a side 14 causing compression by the harder torus shaped outer housing 4 and friction by the bead shape tips 13 and the projections 17. The bead shape tips 13 and the projections 17 close in the direction of an applied torque 114, creating a strong bond that resists separation. The strong bond can be released when the dog owner applies a reverse twisting motion to remove the chew stick 40 from the holder 100.

I claim:

1. A pet treat holding device, comprising:
a first housing being a torus shape and having an inner surface defining an innermost circumference of said torus shape, said first housing having a thickness, said inner surface defining an inner perimeter of said torus shape, said inner surface having an opening extending into said first housing;
an aperture insert configured to be received within said inner perimeter of said torus shape, said aperture insert having a thickness less than said thickness of said first housing, said aperture insert having an opening extending through said thickness, said opening in said aperture insert having a centerpoint, said opening in said aperture insert having a plurality of flexible projections extending toward said centerpoint, each of said flexible projections terminating in a bead-shaped tip;
said first housing and said aperture insert being made of rubber, said rubber of said first housing being harder than said rubber of said aperture insert;
whereby said flexible projections are configured to restrict removal of a chew stick when said chew stick is twisted in a first direction through said opening in said aperture insert and release said chew stick when said chew stick is twisted in a second direction opposite said first direction.

2. A pet treat holding device, comprising:
a first housing having a torus shape and having an inner surface defining an innermost circumference of said torus shape, said first housing having a first thickness said inner surface defining an inner perimeter of said torus shape, said inner surface having an opening extending into said first housing; and an aperture insert configured to be received within said inner perimeter of said shape, said aperture insert having a second thickness less than said first thickness of said first housing, said aperture insert having an opening extending through said thickness, said opening in said aperture insert having a centerpoint, said opening in said aperture insert having a plurality of flexible projections extending toward said centerpoint, each of said flexible projections terminating in a widened bead;

whereby said flexible projections are configured to:

restrict removal of a chew stick when said chew stick is twisted in a first direction through said opening in said aperture insert; and release said chew stick when said chew stick is twisted in a second direction opposite said first direction.

3. The pet treat holding device recited in claim 2, wherein said first housing and said aperture insert are made of rubber.

* * * * *